Figure 3:
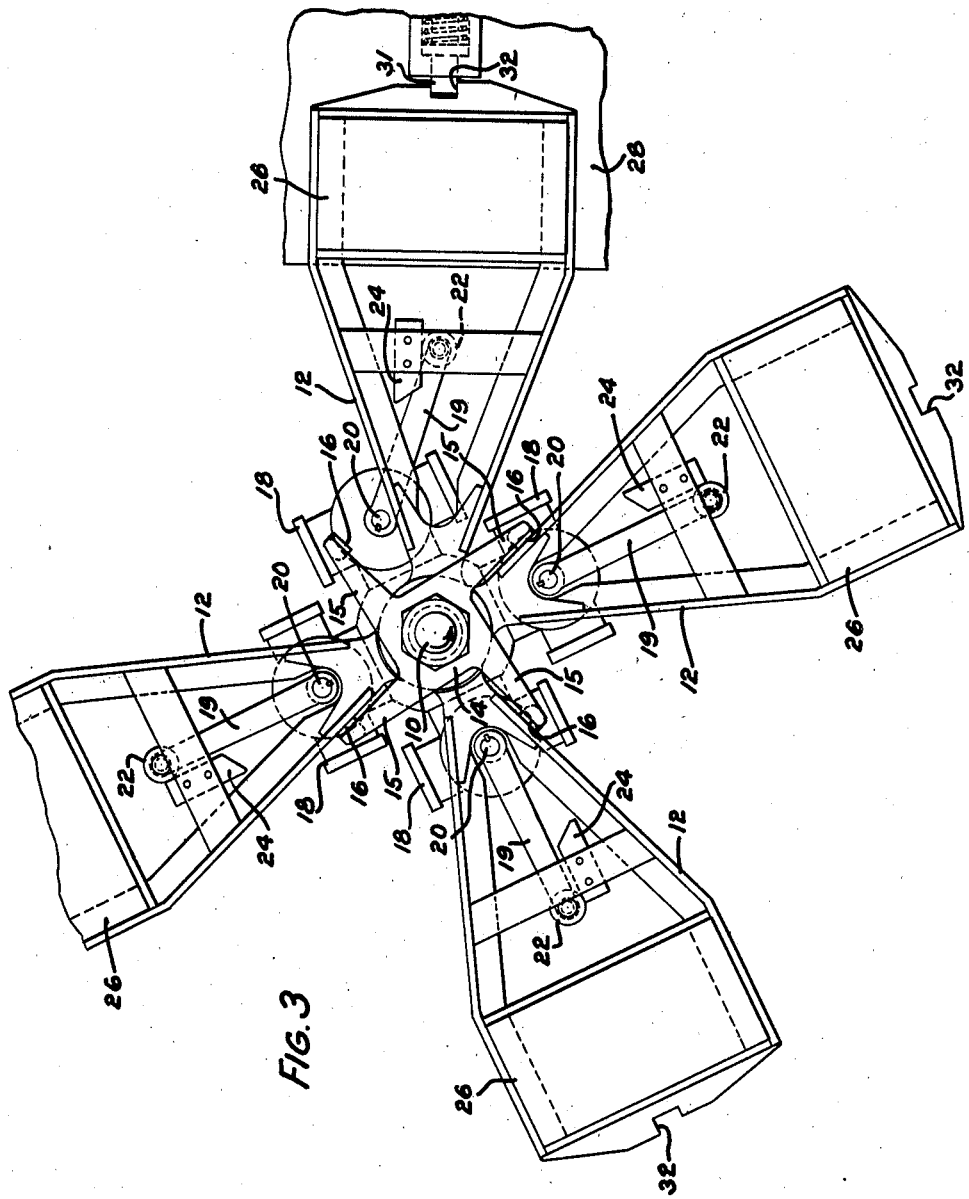

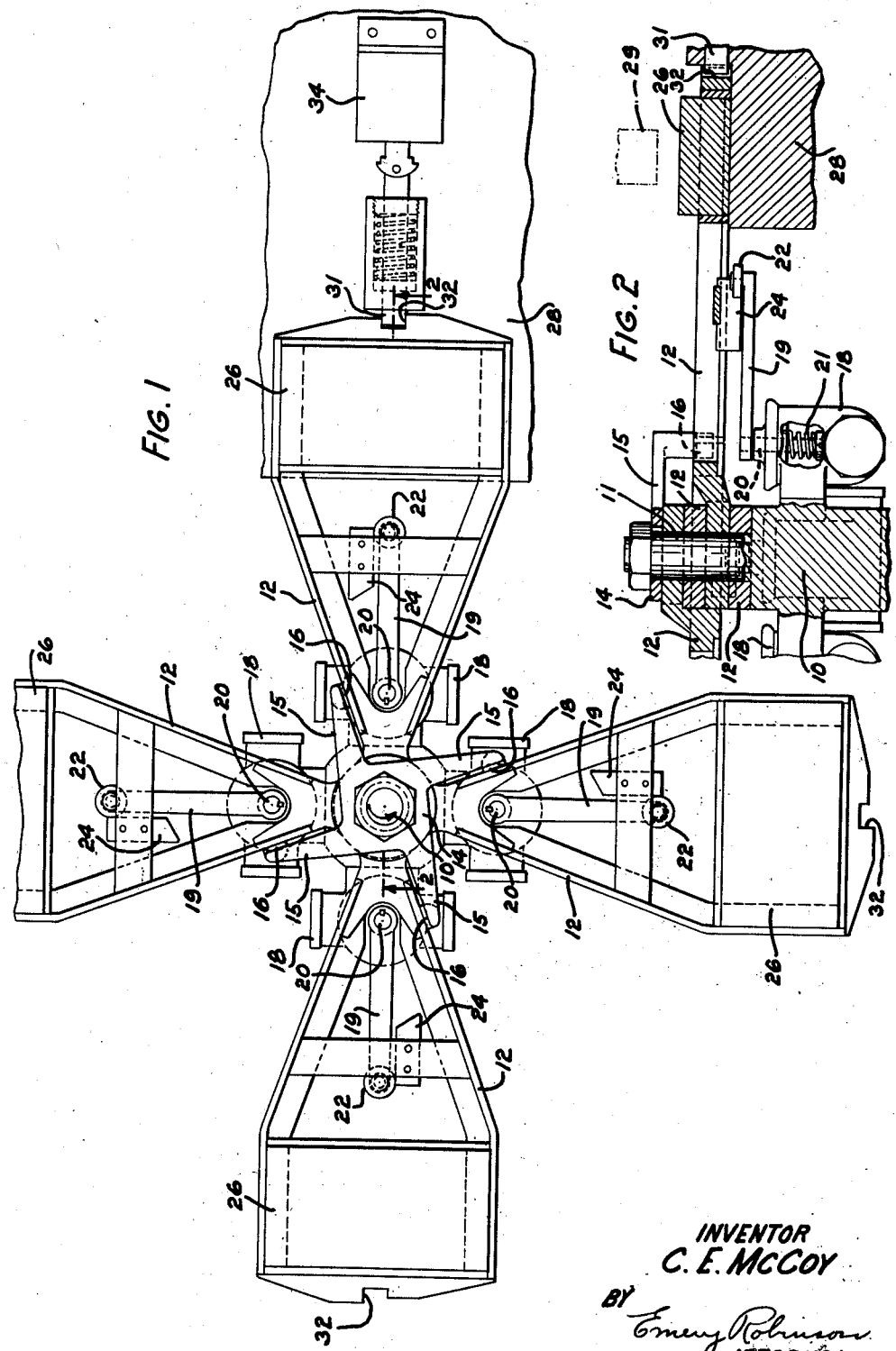

March 16, 1943.    C. E. McCOY    2,314,154
WORK FEEDING APPARATUS
Filed Oct. 10, 1940    2 Sheets-Sheet 2

INVENTOR
C. E. McCOY
BY Emery Robinson
ATTORNEY

Patented Mar. 16, 1943

2,314,154

UNITED STATES PATENT OFFICE 2,314,154

WORK FEEDING APPARATUS

Clarence E. McCoy, Western Springs, Ill., assignor to Western Electric Company, Incorporated, New York, N. Y., a corporation of New York Application October 10, 1940, Serial No. 360,560

6 Claims. (Cl. 198—19)

This invention relates to work feeding apparatus, and more particularly to a rotary work feeding apparatus for electric welding machines or the like.

Objects of the invention are to provide a simple, durable and reliable apparatus for presenting successive work pieces to a fixed work station.

One embodiment of the invention contemplates the provision of an apparatus for presenting successive work pieces to an electric welding machine, the apparatus comprising a plurality of work carriers individually rotatable about a continuously rotating vertical shaft, the carriers being operatively connected to the shaft by separate coil springs which permit the carriers to dwell at the welding machine during the welding operation, without interrupting the continuous rotation of the shaft.

Other features and advantages of the invention will become apparent from the following detailed description when read in conjunction with the accompanying drawings, in which Fig. 1 is a plan view of a rotary work feeding apparatus embodying the invention;

Fig. 2 is a fragmentary vertical sectional view taken on line 2—2 of Fig. 1, and Fig. 3 is a plan view similar to Fig. 1, illustrating the operation of the apparatus.

The apparatus illustrated in the drawings comprises a rotatable vertical shaft 10 having a reduced upper end portion 11 upon which four radial brackets or work carriers 12, 12 are mounted so as to be individually rotatable about the axis of the shaft. Attached to the upper end of the shaft is a plate 14, which is provided with four equidistantly spaced arms 15, 15, one for each of the work carriers. Each of the arms 15 is formed at its outer end with a depending lug or stop finger 16 for limiting counterclockwise rotation of the associated work carrier relative to the shaft 10.

Attached to the shaft, so as to be rotatable therewith, are four door checks 18, 18, one for each work carrier. These door checks may be of any well known type, those illustrated in the drawings being of the general type disclosed in Patent No. 960,641, issued June 7, 1910, to W. K. Henry. Each door check comprises a spring-pressed oscillatory arm 19 attached to the upper end of a vertical shaft 20 rotatably journaled in the casing of the door check. A coil spring 21 (Fig. 2) encircles the shaft 20 and is adapted to urge the arm 19 in a counterclockwise direction (Fig. 1). A roller 22 is carried on the outer end of each door check arm and is adapted to bear against a plate 24 attached to the associated work carrier, whereby each work carrier is normally pressed against the associated stop finger 16 under the force of the coil spring 21 of the associated door check. Thus, rotary motion of the shaft 10 will normally be transmitted to the work carriers so that the latter will revolve about the axis of the shaft and in the direction of rotation thereof.

When employing the apparatus for feeding work to a welding machine, each of the work carriers is provided at its outer end with a work holding fixture or block 26, upon which the parts to be welded are placed prior to the arrival of the carriers to the welding station. The welding machine may be of any well known type comprising a stationary platen or electrode 28 disposed below a vertically reciprocable electrode 29, only portions of which are illustrated in the drawings. The welding machine is arranged so that the several work carriers may be successively advanced to the welding station, wherein the work holding block 26 rests upon the lower electrode 28 with the parts to be welded positioned directly below the upper electrode 29. A spring pressed locking plunger 31 is provided for locking the work carriers at the welding station, pending the welding operation, each carrier being provided at its outer end with a notch 32 adapted to receive the locking plunger. Any suitable means, such as an electromagnet or solenoid 34, may be provided for automatically retracting the locking plunger to release the work carrier after the welding operation.

In the operation of the apparatus, the shaft 10 rotates continuously in the direction indicated by the arrows in Figs. 1 and 3. Each of the work carriers 12 is caused by its associated door check 18 to revolve with the shaft 10 until it arrives at the welding station. Upon arriving at this station, each work carrier is locked against further movement pending completion of the welding operation. Since the shaft continues to rotate, the oscillatory arm 19 of the door check associated with the locked work carrier is revolved in a clockwise direction against the opposing force of the spring 21, and the associated stop finger 16 moves away from the locked work carrier, as illustrated in Fig. 3. After the welding operation has been completed, the locking plunger 31 is automatically retracted by the solenoid 34, whereupon the released work carrier is quickly but smoothly advanced to its normal position against the stop finger 16 by the associated door check arm 19 under the control of the usual checking piston of the door check. In a similar manner, each of the other work carriers is advanced to the welding station, locked against movement during the welding operation, and then quickly advanced to its normal position against the associated stop finger. Thus, the door checks provide separate elastic driving connections between the several work carriers and the continuously rotating driving shaft 10, whereby each of the work carriers is permitted to dwell at the welding station during the welding operation, without interrupting the continuous rotation of the shaft. This permits the work carriers to move smoothly and uninterruptedly during the loading and unloading operations, thus relieving the operator from the shocks and hazards incident to repeated starting and stopping, as in the usual type of work indexing table.

It is to be understood that the invention is not limited to the particular embodiments thereof herein illustrated and described, except insofar as is defined by the appended claims.

What is claimed is:

1. In a work feeding apparatus, a continuously rotating shaft, a series of work carriers mounted on said shaft, for rotation co-axially thereof and independently of each other, stop means limiting the movement of said carriers in one direction relative to said shaft, and a separate spring for holding each carrier against said stop means.

2. In a work feeding apparatus, a continuously rotating shaft, a work carrier rotatable on said shaft, stop means limiting the movement of the carrier in the direction of rotation of the shaft, yieldable means for urging said carrier against said stop means, and retractable stop means for temporarily interrupting the movement of said carrier at predetermined intervals.

3. In a work feeding apparatus, a continuously rotating shaft, a plurality of work carriers mounted on and individually rotatable co-axially of said shaft, a separate elastic driving connection between each of said work carriers and said shaft, and means for temporarily interrupting the rotary movement of each of said carriers at predetermined intervals.

4. In a work feeding apparatus, a continuously rotating shaft, a series of work carriers co-axially rotatable on said shaft and extending radially therefrom, a separate yieldable driving connection between each of said work carriers and said shaft, a retractable stop for temporarily interrupting the rotary movement of each work carrier upon its arrival at a predetermined position, and means for retracting said stop at predetermined intervals.

5. In a work feeding apparatus, a continuously rotating shaft, a series of work carriers, co-axially rotatable on said shaft and extending radially therefrom, a separate yieldable driving connection between each of said work carriers and said shaft whereby the rotary movement of said work carriers may be temporarily interrupted without interrupting the rotation of said shaft, a retractable stop engageable with the outer ends of said work carriers for temporarily interrupting the rotary movement thereof upon their arrival at a predetermined position, and electromagnetic means for momentarily retracting said stop at predetermined intervals.

6. In a work feeding apparatus, a continuously rotating shaft, a work carrier rotatable on said shaft, stop means limiting the movement of the carrier in the direction of rotation of the shaft, yieldable means for urging said carrier against said stop means, retractable stop means for temporarily interrupting the movement of said carrier at predetermined intervals, and means for controlling the speed at which said carrier is advanced to its normal position against the first mentioned stop means under the force of said yieldable means.

CLARENCE E. McCOY.